United States Patent [19]

Schick

[11] Patent Number: 4,850,524

[45] Date of Patent: Jul. 25, 1989

[54] VERTICAL STRIP CLAD WELDING METHOD AND APPARATUS

[75] Inventor: Wilbur R. Schick, San Antonio, Tex.

[73] Assignee: Southwest Research Institute, San Antonio, Tex.

[21] Appl. No.: 163,363

[22] Filed: Mar. 2, 1988

[51] Int. Cl.[4] ............................. B23K 9/04; B23K 9/18
[52] U.S. Cl. ..................................... 228/102; 228/216; 228/222; 228/11; 228/9; 219/76.1; 219/76.14; 219/126
[58] Field of Search ............... 228/102, 103, 215, 216, 228/222, 11, 9, 50; 219/76.1, 76.11, 76.14, 126; 164/495, 497, 443, 437

[56] References Cited

U.S. PATENT DOCUMENTS

| 3,263,890 | 8/1966 | Togo | 228/216 |
|---|---|---|---|
| 4,021,637 | 5/1977 | DeHaeck | 219/126 |
| 4,035,605 | 7/1977 | Taniguchi et al. | 219/126 |
| 4,182,951 | 1/1980 | Kuder | 228/216 |
| 4,420,676 | 12/1983 | Hirsch et al. | 219/126 |
| 4,577,676 | 3/1986 | Watson | 164/443 |

FOREIGN PATENT DOCUMENTS

| 2313169 | 2/1977 | France | 228/216 |
|---|---|---|---|
| 16762 | 7/1969 | Japan | 228/216 |
| 32839 | 3/1977 | Japan | 228/216 |
| 73464 | 6/1980 | Japan | 219/126 |

Primary Examiner—Nicholas P. Godici
Assistant Examiner—Samuel M. Heinrich
Attorney, Agent, or Firm—Matthews & Branscomb

[57] ABSTRACT

Method and apparatus for vertical strip clad overlay welding. The method comprises matching the vertical travel of a special welding shoe to an appropriate amount of strip electrode melt-off necessary to maintain a preset molten pool level within a reservoir trough provided by the shoe. The welding shoe comprises a water cooled copper mold for forming the weld bead and a ceramic insert connected to the mold for providing the reservoir trough. Apparatus for correlating the vertical travel speed of the shoe with the strip electrode melt-off is disclosed. Apparatus for applying a plurality of successive weld beads to a vertical vessel wall is also disclosed.

16 Claims, 12 Drawing Sheets

VERTICAL STRIP CLAD WELDING METHOD AND APPARATUS

BACKGROUND OF THE INVENTION

The present invention relates generally to build-up welding. More particularly, the present invention relates to a method and apparatus for vertical strip clad overlay welding.

Weld overlay cladding has heretofore been utilized for mitigating corrosive attack on digesters and other vessels. Prior technology for weld overlay cladding on vessels has employed the submerged arc welding (SAW) process and equipment which allows the weld to progress in a horizontal mode (vessel axis vertical) using two welding wires driven through the welding head. The first wire is usually of smaller diameter than the second and establishes a "ledge" or "step" for the second weld-wire-arc to subsequently consume. The granular flux required for this process is held by means of a special heat-resistant rubber belt pressed against the vessel wall just below the weldment. The angle of the welding wires with respect to the vertical vessel wall is approximately thirty (30) degrees. The speed of this horizontal overlay application using two welding heads positioned opposite each other approximately one hundred eighty (180) degrees apart and separated vertically approximately two feet (2') accomplishes approximately four feet (4') of vertical wall overlay per twenty-four (24) hour day. The horizontal overlay application process typically employs a rotating platform apparatus and scaffolding or staging is generally required. Each rotation is typically made in about ten (10) minutes and the vertical rate of advancement is approximately eleven-sixty-fourths inch (11/64") per head.

Although the horizontal weld overlay cladding apparatus and method described hereinabove is capable of depositing satisfactory overlay cladding, the deposition rate is low. A faster deposition rate overlay welding process is required to make the cladding process more cost effective for in situ cladding of vessels.

SUMMARY OF THE INVENTION

Accordingly, the present invention provides a method and apparatus for vertical strip clad overlay welding wherein the rate of application is much faster than the best existing commercial process. The present invention uses a strip welding electrode to accomplish the cladding, employing a vertical weld progression and a special welding shoe to consummate the weldment, while molding and cooling the deposited overlay alloy metal. The method may be depicted as a reservoir of liquid weldment which is applied to a vertical surface and held by a special cooling shoe. The method matches the vertical travel speed of the shoe to the amount of strip electrode melt-off necessary to maintain a preset molten pool level.

The welding shoe of the present invention provides a ceramic insert which defines a reservoir or trough for the arc zone, flux, and weldment. Further, a channel of the desired weld bead shape is provided in the face of the shoe which cools the weldment to solidification. Finally, certain embodiments of the welding shoe permit bead-to-bead tie-ins and fusion of adjacent weld beads to provide a continuous quality overlay.

The preferred system for controlling the vertical travel of the shoe comprises a high frequency (HF) wire embedded in the ceramic insert at the desired liquid metal level. A multimeter senses voltage variations in the high frequency wire and a controller processes the signal from the multimeter to maintain, increase, or decrease the vertical travel speed of the shoe. Apparatus is also provided for readily applying a plurality of successive, adjacent weld beads to a vessel wall.

The present invention fills a need in field applications where vessels and towers, as in chemical plants or paper mills, are required to be overlay-clad in short turn-around time periods. These vessels are vertical and stationary and exceptionally expensive to replace. The faster deposition rate provided by the overlay welding process of the present invention makes the cladding process more cost effective for in situ cladding of these vessels.

DETAILED DESCRIPTION OF THE PREFERRED EMBODIMENT

Figure 1:
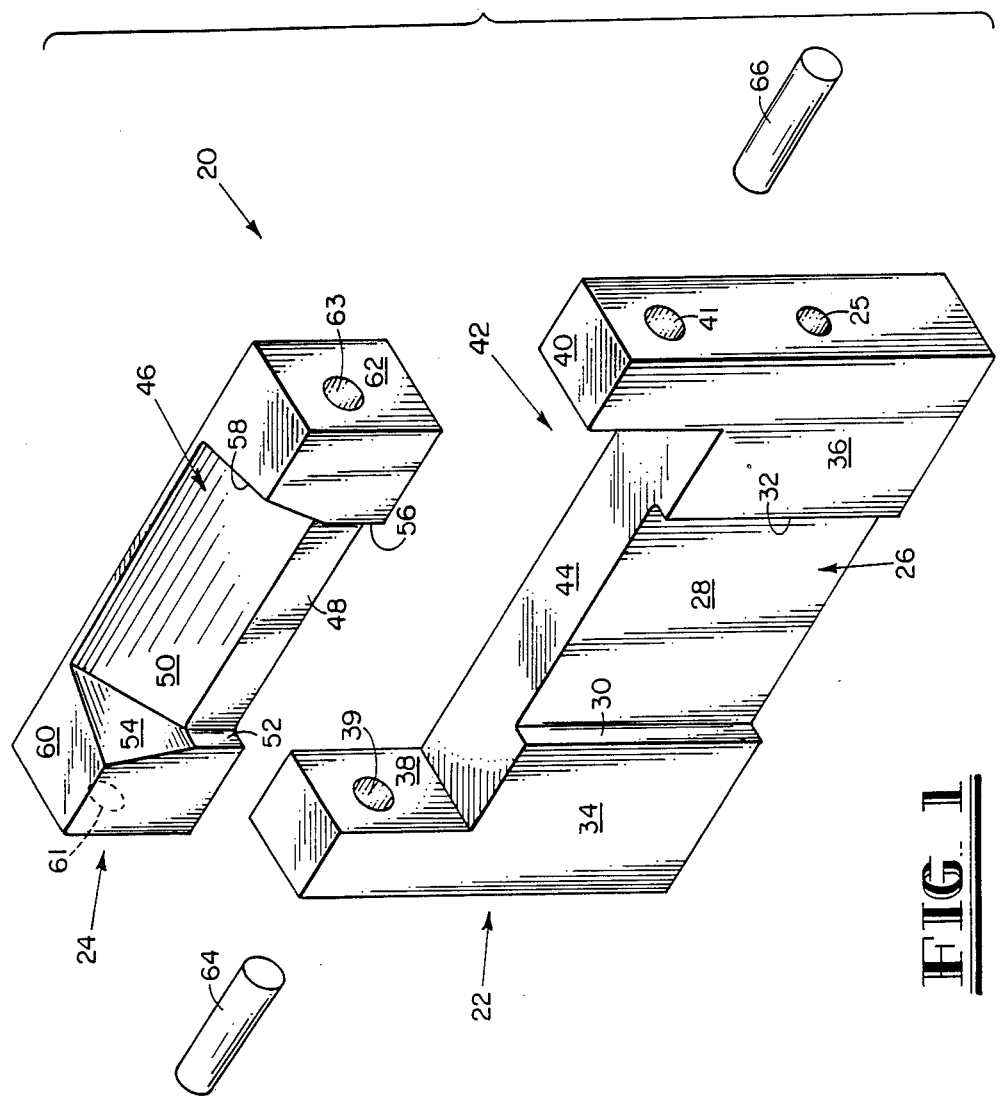
FIG. 1 is an exploded perspective view of one embodiment of the welding shoe of the present invention.
Figure 5:
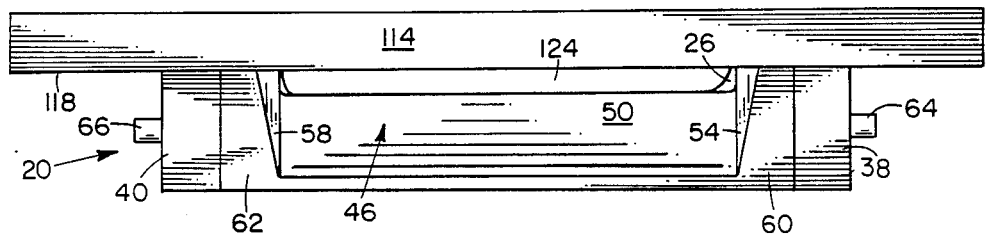
FIG. 5 is a top plan view illustrating the utilization of the embodiment of the welding shoe illustrated in FIG. 1 in the application of a weld bead to a base plate.
Figure 4:
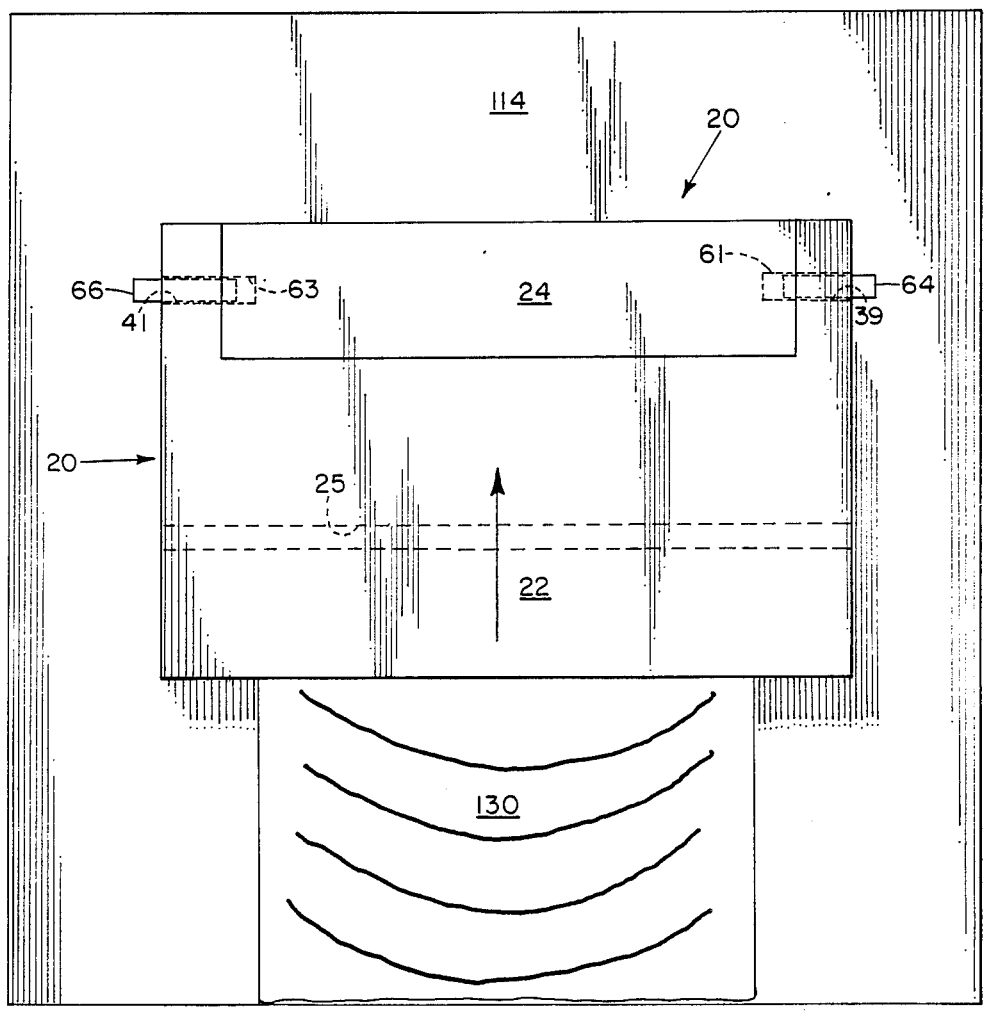
FIG. 4 is an elevational view illustrating the utilization of the embodiment of the welding shoe illustrated in FIG. 1 in the application of a weld bead to a base plate.

Referring to FIG. 1, FIG. 4, and FIG. 5 an embodiment of the welding shoe of the present invention is identified by the number 20. The welding shoe 20 comprises a shoe mold 22 and a shoe insert 24 adapted to be removably connected to the mold 22. Shoe mold 22 is preferably a unitary piece of copper having a vertical channel 26 in an inner surface thereof and a cooling passage 25 therein. Passage 25 permits water to pass through mold 22 for cooling mold 22. Channel 26 is defined by a substantially planar channel bottom 28, a first channel side wall 30, and a second channel side wall 32 opposite side wall 30. A first leg 34 is located on one side of channel 26 and a second leg 36 is located on the opposite side of channel 26. A pair of upstanding arms 38 and 40 on opposite ends of mold 22 define a slot 42 therebetween having a bottom 44. A passage 39 extends through arm 38 and a passage 41 extends through arm 40.

Referring again to FIG. 1, FIG. 4, and FIG. 5, insert 24 comprises a unitary piece of ceramic material having a channel or trough 46 therein. Trough 46 is defined by a lower bottom 48, an upper bottom 50, a first lower side wall 52, a first upper side wall 54, a second lower side wall 56 opposite side wall 52, and a second upper side wall 58 opposite side wall 54. The first end 60 of insert 24 has a passage 61 extending partially therethrough. The second end 62 of insert 24 has a passage 63 extending partially therethrough.

Referring again to FIG. 1, FIG. 4, and FIG. 5, the shoe 20 further comprises a pair of plugs 64 and 66 for removably connecting insert 24 to mold 22. Insert 24 is preferably connected to mold 22 by inserting insert 24 into slot 42 so that insert 24 is supported by bottom 44, trough bottom 48 is aligned with channel bottom 28, passage 61 is aligned with passage 39, and passage 63 is aligned with passage 41. Plugs 64 and 66 are thereafter inserted through aligned passages 39 and 61 and aligned passages 63 and 41, respectively. When insert 24 is connected to mold 22, trough bottom 50 is at an incline of approximately forty-five (45) degrees with respect to the vertical alignment of trough bottom 48 and channel bottom 28. Further, when shoe 20 is in use, as illustrated in FIG. 4 and FIG. 5, trough 46 is in fluid communication with vertical channel 28. Insert 24 may be disconnected from mold 22 by withdrawing plugs 64 and 66 from passages 61 and 63, respectively, and removing insert 24 from slot 42.

Figure 2:
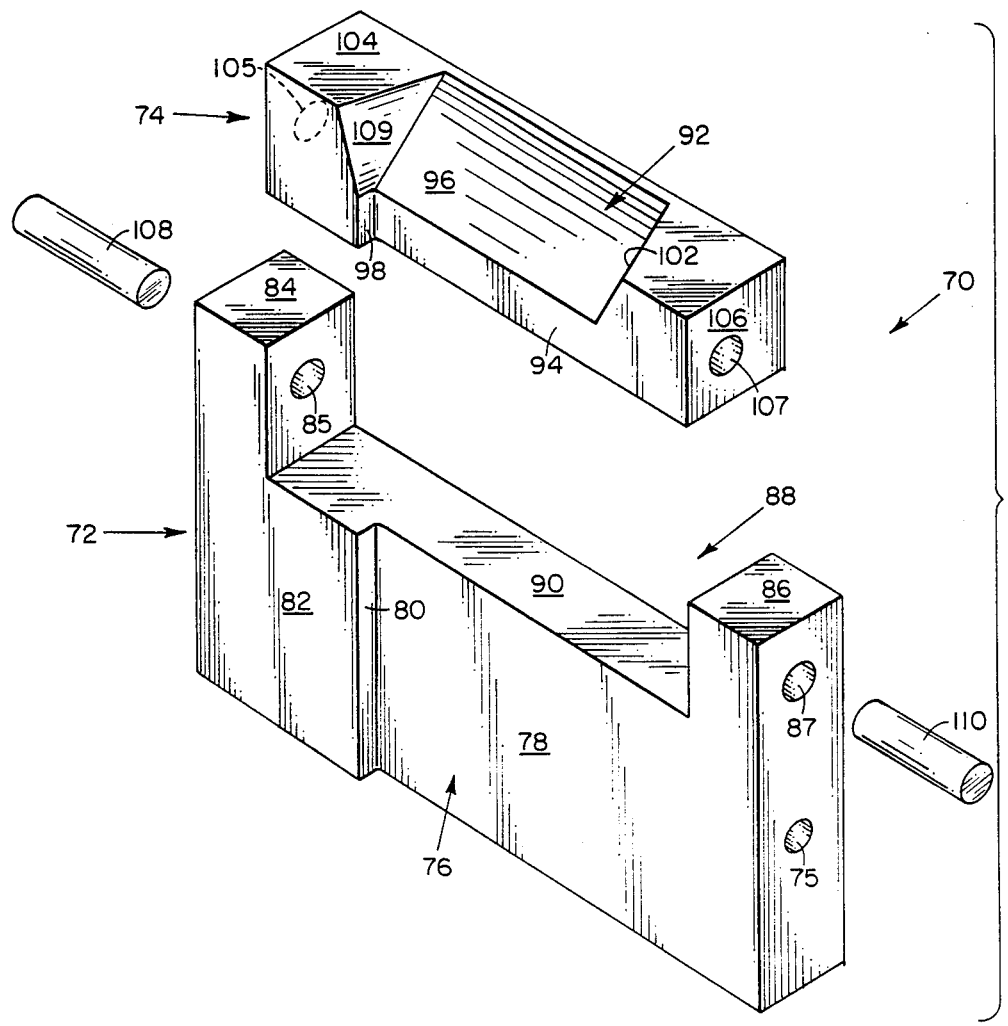
FIG. 2 is an exploded perspective view of an alternate embodiment of the welding shoe of the present invention.
Figure 7:
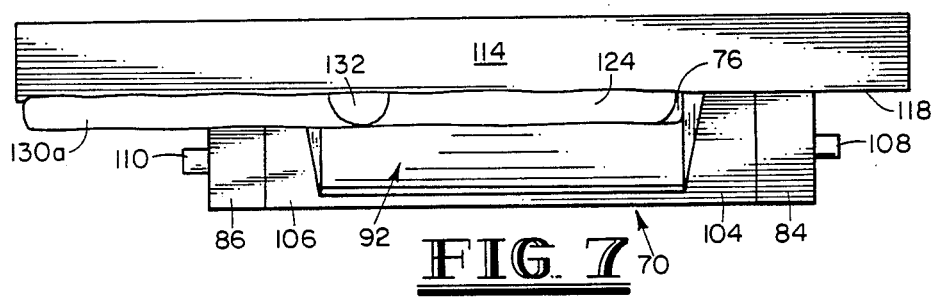
FIG. 7 is a top plan view illustrating the utilization of the embodiment of the welding shoe illustrated in FIG. 2 in the application of a weld bead to a base plate.
Figure 6:
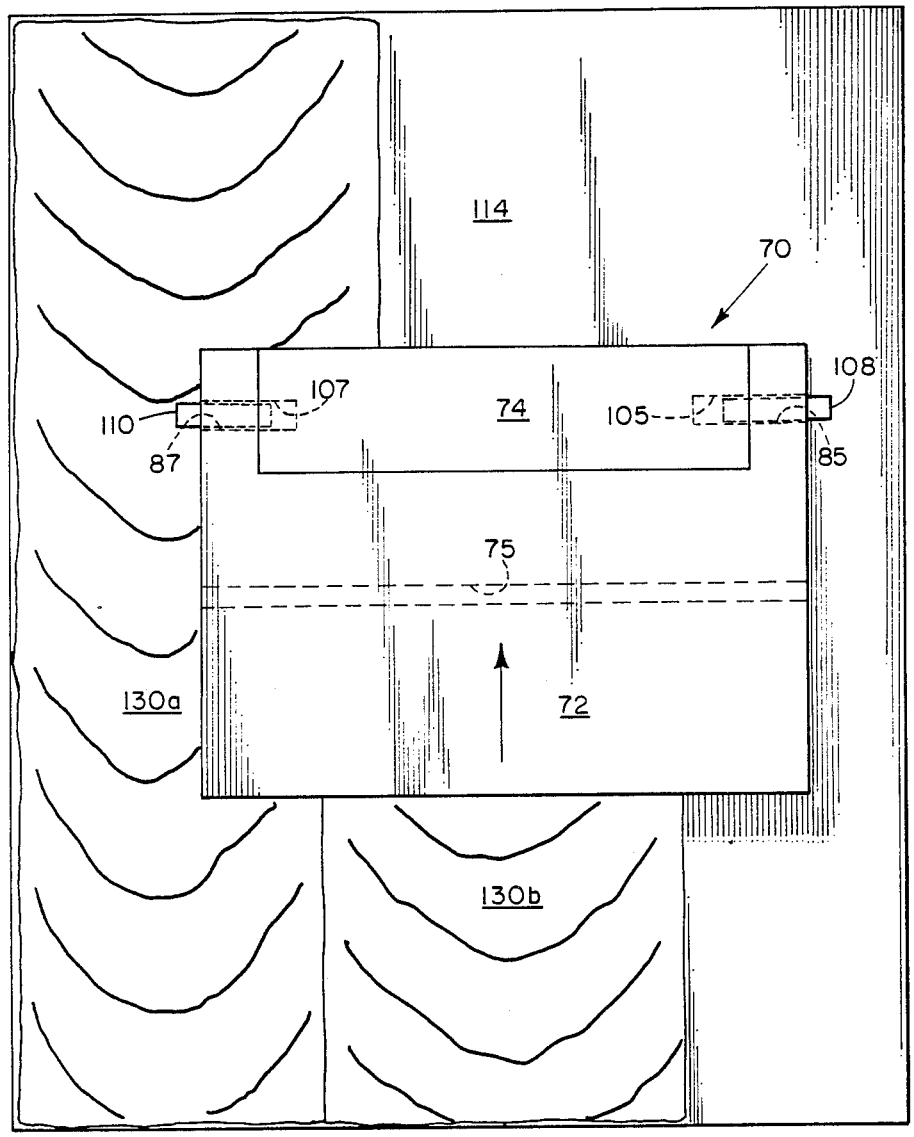
FIG. 6 is an elevational view illustrating the utilization of the embodiment of the welding shoe illustrated in FIG. 2 in the application of a weld bead to a base plate.

Referring to FIG. 2, FIG. 6, and FIG. 7, an alternate embodiment of the welding shoe of the present invention is identified by the number 70. The welding shoe 70 comprises a shoe mold 72 and a shoe insert 74 adapted to be removably connected to the mold 72. Shoe mold 72 is preferably a unitary piece of copper having a vertical channel 76 in an inner surface thereof and a cooling passage 75 therein. Passage 75 permits water to flow through mold 72 for cooling mold 72. Channel 76 is defined by a substantially planar channel bottom 78 and a channel side wall 80. As illustrated in FIGS. 6-7 and described hereinbelow, an adjacent weld bead is utilized to define a channel side wall opposite side wall 80. Mold 72 further comprises a leg 82 on one side of channel 76. A pair of upstanding arms 84 and 86 on opposite ends of mold 72 define a slot 88 therebetween having a bottom 90. A passage 85 extends through arm 84 and a passage 87 extends through arm 86.

Referring again to FIG. 2, FIG. 6, and FIG. 7, insert 74 comprises a unitary piece of ceramic material having a channel or trough 92 therein. Trough 92 is defined by a lower bottom 94, an upper bottom 96, a lower side wall 98, a first upper side wall 100, and a second upper side wall 102 opposite side wall 100. As illustrated in FIGS. 6-7 and described hereinbelow, an adjacent weld bead 130a is utilized to define a lower trough side wall opposite lower side wall 98. Insert 74 further comprises a first end 104 having a passage 105 extending partially therethrough and a second end 106 having a passage 107 extending partially therethrough.

Referring again to FIG. 2, FIG. 6, and FIG. 7, shoe 70 further comprises a pair of plugs 108 and 110 for removably connecting insert 74 to mold 72. Insert 74 is preferably connected to mold 72 by inserting insert 74 into slot 88 so that insert 74 is supported by slot bottom 90, trough bottom 94 is aligned with channel bottom 78, passage 105 is aligned with passage 85, and passage 107 is aligned with passage 87. Plug 108 is thereafter inserted into passage 85 and passage 105 and plug 110 is inserted into passage 87 and passage 107. When insert 74 is connected to mold 72, trough bottom 96 is at an incline of approximately forty-five (45) degrees with respect to vertical alignment of trough bottom 94 and channel bottom 78. Further, when shoe 70 is in use, as illustrated in FIG. 6 and FIG. 7, trough 92 is in fluid communication with channel 78. Insert 74 may be disconnected from mold 72 by withdrawing plugs 108 and 110 from passages 105 and 107, respectively.

Figure 3:
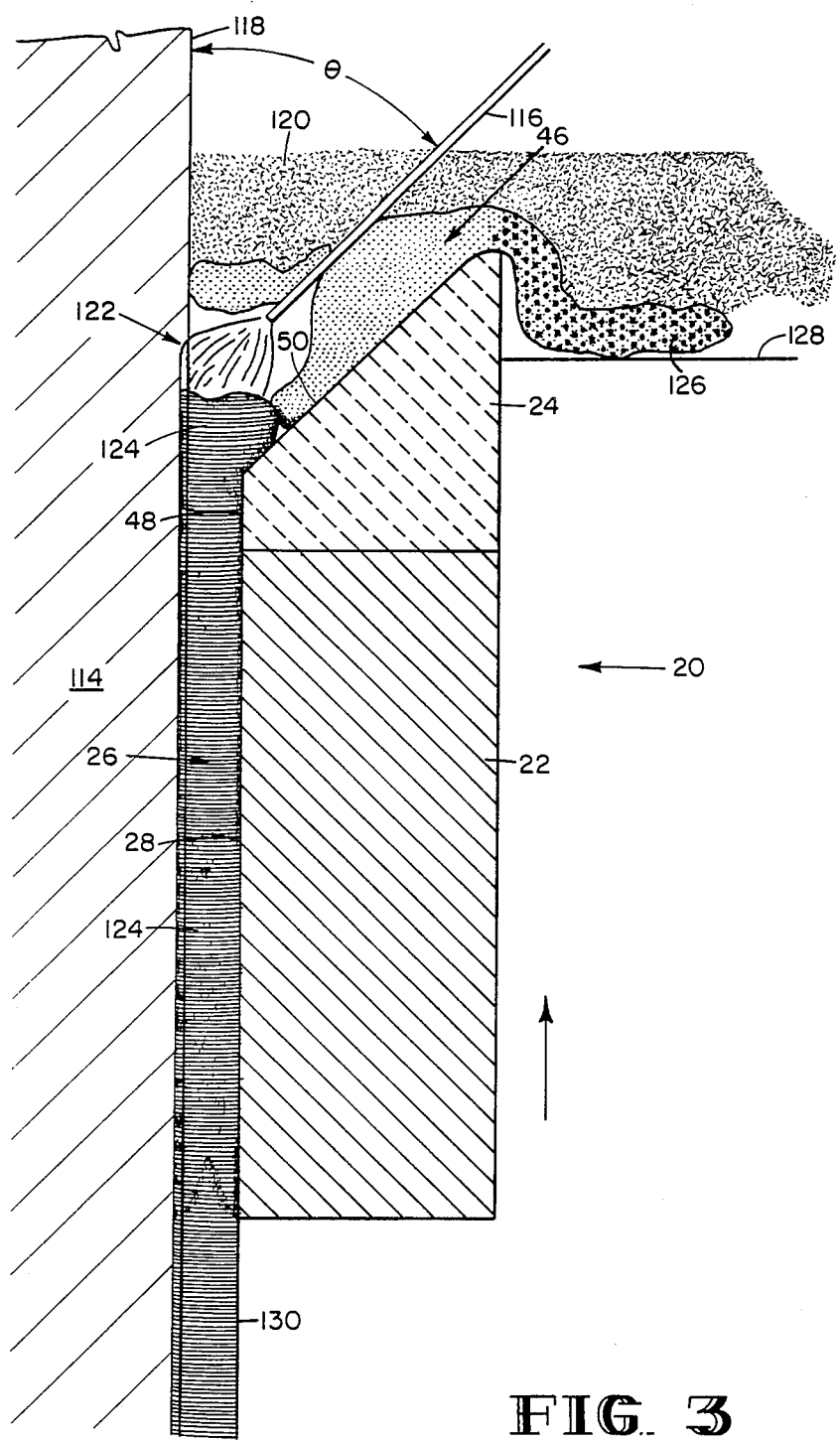
FIG. 3 is a cross-sectional side view illustrating the welding shoe and method of the present invention in the application of a weld bead to a base plate.

Referring to FIGS. 3–5, the method for vertical strip clad overlay welding of the present invention will be described in greater detail. A welding shoe of the present invention, such as shoe 20, is positioned and supported adjacent to a vertical base plate 114 so that legs 34 and 36 are substantially flush with the outer surface 118 of plate 114 and inner surface or channel bottom 28 faces outer surface 118 substantially parallel to vertical wall 114. A strip electrode 116 is positioned above shoe 20 at a predetermined angle $\theta$ relative to the outer surface 118 of vertical base plate 114. In the preferred embodiment, $\theta$ is approximately forty-five (45) degrees, although $\theta$ may vary within the range of thirty (30) degrees to ninety (90) degrees. The angle $\theta$ should be the same as the incline angle of trough bottom 50 (e.g., forty-five degrees). Electrode 116 is connected to a strip feeder (not shown in FIG. 3) for continuously feeding electrode 116 to the appropriate position relative to surface 118. Further, electrode 116 is preferably positioned within a granular flux 120 in accordance with the submerged arc welding (SAW) process. An arc is thereafter generated between electrode 116 and base plate 114 so as to create an arc melt 122. The arc melt 122 forms a liquid weldment 124, which is received within trough 46, thereby forming a reservoir or excess of liquid weldment 124 within trough 46. A slag 126 is also formed and received within a hopper 128 affixed to shoe 20. As the shoe 20 travels vertically upward, as illustrated by the arrow in FIG. 3 and FIG. 4, the liquid weldment 124 within trough 46 flows into channel 26 and is cooled therein so as to form a solid weldment 130. Further, the liquid reservoir weldment 124 within trough 46 continuously fills channel 26 as shoe 20 travels vertically upward.

Figure 11:
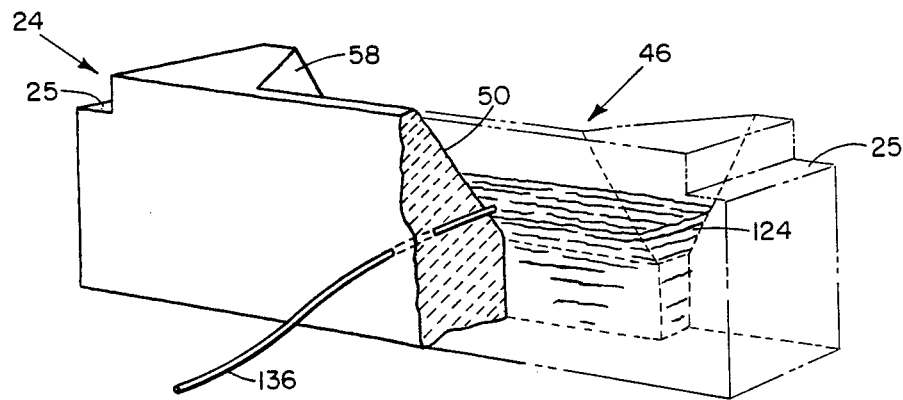
FIG. 11 is a cut-away rear view of one embodiment of the ceramic insert of the welding shoe of the present invention illustrating an embedded wire for sensing weld metal level.

It is to be understood that the method of the present invention utilizes gravity to facilitate the flow of liquid weldment 124 from trough 46 in the upper portion of shoe 20 to channel 26 in the lower portion of shoe 20 as mold 22 travels vertically upward over weldment 124. Further, the incline of trough bottom 50 relative to trough bottom 48 and channel bottom 28 further facilitates the flow of liquid weldment from trough 46 into channel 26. It is also to be understood that channel 26 will preferably be filled with flux 120 upon start-up of the vertically upward weld progression. Further, proper control of the melt-off and heat input for the process is generally a function of the amperage, voltage, travel speed of the welding shoe, and preheating of the base plate. For example, a 1100 ampere starting current with two hundred fifty (250) degrees degrees Farenheit preheat on a carbon steel base plate, then adjusted to nine hundred (900) amperes, 28-29 volts, may be used to consume a sixty (60) millimeters (mm) X 0.5 mm strip of type 309 stainless steel material. Finally, it is to be understood that hopper 128 may be constructed of PVC and may be connected to shoe 20 by a wire (not shown) positioned about hopper 128 and connected on the opposite ends thereof to plugs 64 and 66. Hopper 128 may be substantially U-shaped and have side walls flush with the back of shoe 20 and a portion of plate 114 above shoe 20. As illustrated in FIG. 11, insert 24 may be provided with a ledge 25 on the opposite ends thereof for supporting hopper 128.

It is to be understood that the method for vertical clad welding of the present invention may be practiced with each of the embodiments of the welding shoe of the present invention along with standard or conventional welding equipment and materials. For example, a shoe travel carriage having a digital travel motor and control may be mounted on a vertical beam positioner with the wheels of the carriage gripping both sides of the beam. A 1500 ampere power supply and automatic submerged arc strip drive welding head may also be utilized. Further, the submerged arc welding (SAW) process with normal granular flux may be utilized. Inert gas shielding may also be utilized. It is also to be understood that the vertical strip clad overlay welding method of the present invention may be utilized to apply various alloys using various welding fluxes and on various weldable base materials.

The rate of application using the present invention is many times faster than the best existing commercial process. For example, approximately fifty (50) pounds per hour of cladding can be applied with the vertical method of the present invention using nine hundred (900) amperes and a sixty (60) millimeters (mm) X 0.5 mm stainless steel strip electrode. This rate of application is more than three times the fourteen (14) pounds per hour of existing commercial processes using a dual wire, horizontal welding method. Further, the vertical method of the present invention allows the cladding to be made essentially any thickness desired by varying the depth of the cooling channel. For example, the cladding may be one-eighth inch ($\frac{1}{8}$") or three-sixteenths inch (3/16") thick. Further, the utilization of wider strip electrodes, such as ninety millimeters (90 mm) or one hundred twenty millimeters (120 mm), also increases the rate of application accordingly. For example, one hundred (100) pounds of cladding per hour can be applied with the present invention utilizing a one hundred twenty millimeters (120 mm) strip electrode, six times the rate of existing field methods.

It is also to be understood that the amount of flux required for the vertical method of clad welding disclosed herein is approximately one-fourth ($\frac{1}{4}$) the amount used for the flat or horizontal positions, thereby providing a substantial savings in flux cost. Further, the method of the present invention is capable of producing continuously sound weld deposits that can be made with relatively shallow or minimum penetration and dilution of the base material with the weld overlay. Finally, it is to be understood that the heat effected zone of the base material is also shallow or kept to a minimum.

Referring to FIG. 6 and FIG. 7, the shoe 70 of the present invention may also be utilized to apply a weld bead 130b to a vertical base plate 114 adjacent to a weld bead 130a in a manner similar to that described in connection with shoe 20. However, shoe 70 is utilized by positioning leg 82 flush with outer surface 118 and the opposite side of channel 76 flush with the outer surface of bead 130a. As the liquid weldment 124 is received within channel 76, a bead tie-in 132 is formed between weldment 124 and adjacent bead 130a. Further, solidified weld bead 130a forms a retaining side wall to impede run-off of liquid weldment 124 from channel 76 as the shoe 70 travels vertically upward, as illustrated by the arrow in FIG. 6. That is, weld bead 130a defines a side wall opposite channel side wall 80 for defining the desired shape of weld bead 130b. The single overlapping shoe 70 may therefore be utilized to form bead-to-bead tie-ins and fusion of adjacent weld beads, thereby providing a continuous quality overlay.

Figure 8:
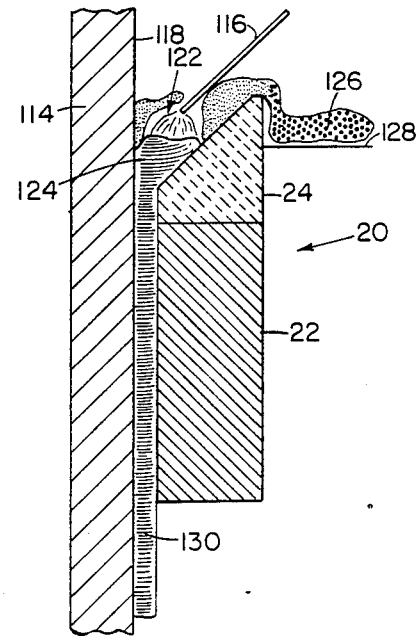
FIGS. 8–10 are comparative cross-sectional side views illustrating the desirability of proper correlation between electrode melt-off and shoe travel.
Figure 9:
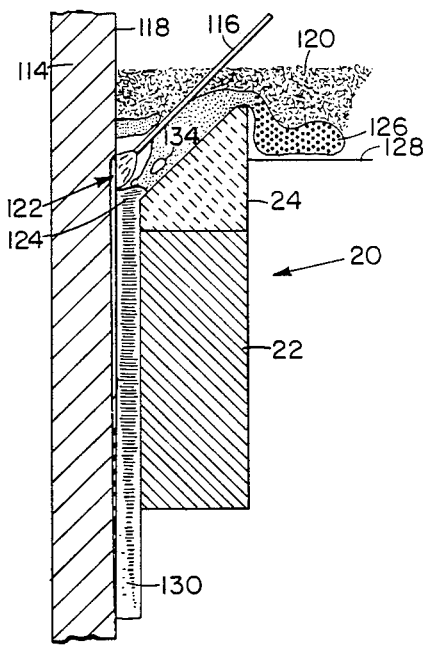
Figure 10:
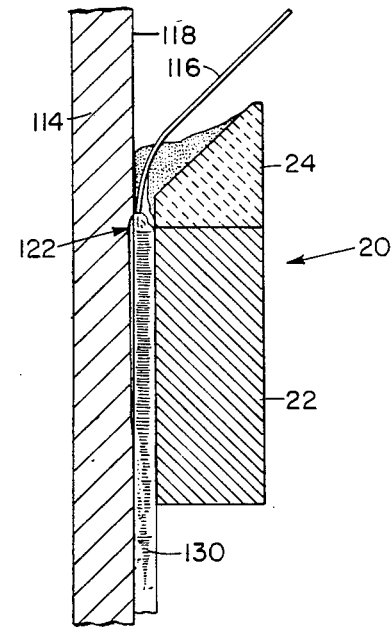

Referring to FIGS. 8-10, with reference to FIG. 3, the desirability of matching or correlating the vertical travel of the welding shoe of the present invention to the melt-off of strip electrode 116 will be described in greater detail. It is to be understood that FIG. 3 illustrates the desired condition wherein the strip electrode melt-off and the vertical travel of the shoe 20 are properly matched. In FIG. 3 the trough 46 is filling with a reservoir of liquid weldment 124 and penetration of the base plate 114, arc position, and control of the welding process are optimum. However, FIG. 8 illustrates the undesirable condition wherein the liquid weldment reservoir 124 within trough 46 is overfilling. This condition is caused by slow speed or vertical travel of the shoe 20 relative to the melt-off of strip electrode 116. FIG. 9 illustrates the undesirable condition wherein the liquid weldment reservoir 124 is not adequately filling. This condition is caused by excessive vertical travel or speed of the shoe 20 relative to the melt-off of strip electrode 116. Further, this condition results in excessive undercutting and penetration of the base plate 114, with melt-off of electode 116 above the liquid weldment puddle 124 and large weldment splatters 134 embedded in the slag 126. Finally, FIG. 10 illustrates the undesirable condition wherein the excessive vertical travel speed of the shoe 20 relative to the melt-off of strip electrode 116 causes the liquid weldment reservoir to recede. This condition occurs just before loss of the melt and is undesirable due to damage which may occur from arcing on the mold 20. Accordingly, it is preferable that the vertical travel speed of the shoe 20 be correlated or matched with the melt-off of electrode 116 such that an appropriate level of liquid weldment 124 is maintained within trough 46, thereby allowing the reservoir of liquid weldment 124 within trough 46 to continuously fill channel 28 as shoe 20 travels vertically upward.

Figure 12:
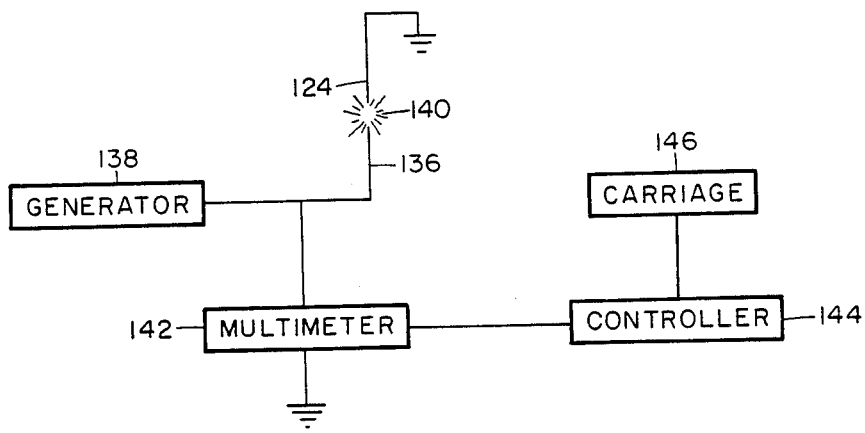
FIG. 12 is a schematic block diagram illustrating the control system of the present invention for correlating shoe travel speed to weld metal level.

Referring to FIGS. 11 and 12, the control system or apparatus for correlating the vertical travel speed of shoe 20 to the level of the weld metal 124 within the trough 46 preferably comprises a wire 136 which is embedded within ceramic insert 24 so as to protrude through approximately the center of bottom 50 into trough 46 at the desired level or height of the liquid weldment 124. The wire 136 is energized to detect voltage changes or changes in conductance by means of a high frequency spark current generator 138. For example, a high frequency generator having a maximum output of 3000 volts may be utilized. A high frequency current is imposed on the wire 136 since repeated electrical contact with the liquid metal 124 cannot be assured due to the slag, oxidation, and erosion effects caused by welding. The sensing of the weldment level occurs when the level of the weld metal 124 within trough 46 rises to a height close enough for a high frequency arc 140 between wire 136 and weld metal 124 to fire, thus completing the circuit with ground. A multimeter 142 connected across the high frequency wire 136 to ground is utilized to detect voltage variations. The multimeter may be protected by placing a high voltage AC probe (not shown) in the circuit. Typically, voltage decreases when the molten weld metal 124 begins to approach the level of wire 136. When the metal level reaches the wire level, the high frequency arc 140 jumps from the wire 136 to the melt 124 and the multimeter 142 decreases to nil or overload reading. In the event the speed of shoe 20 increases and the melt level becomes lower, the established voltage reading is reestablished. For example, voltage may drop to zero with a rise in the level of weldment 124 but then return to 28 volts open circuit when the level of weldment 124 recedes.

Referring again to FIG. 12, the multimeter is connected to, or preferably part of, a controller 144 which is connected to a carriage 146. Carriage 146 is connected to shoe 20. Controller 144 converts the signal it receives from the multimeter 142 to an appropriate instruction to the carriage 146. The instruction from the controller 144 will cause carriage 146 to maintain, increase, or decrease the vertical travel speed of shoe 20. Controller 144 is preferably a microprocessor which is programmed to continuously receive and interpret signals from the multimeter 142 and instruct the shoe carriage 146 accordingly. The control system steps thus comprise the steps of sensing the voltage drop from wire 136 and converting the corresponding signal to an appropriate instruction to shoe carriage 146.

It is to be understood that the control system or apparatus of the present invention may be utilized for correlating the vertical travel speed of each of the embodiments of the welding shoe of the present invention with the level of the weld metal 124 within the trough of the respective shoe. The desired control is provided by the voltage drop which occurs when the high frequency circuit is completed. When the level of the weld metal 124 recedes sufficiently, the high frequency arc must extinguish. Thus, the completion of the high frequency circuit is utilized as the signal for the speed control of the vertical carriage 146 to be increased by controller 144. It is also to be understood that wire 136 is preferably a high melting alloy, such as one-thirty-second inch (1/32") Molybdenum wire, to resist melting and alloying with the weld metal 124. Wire 136 may also be a copper wire. Further, although wire 136 will initially protrude through bottom 50, wire 136 may become slightly recessed within insert 24 after the initial arc 140. Nevertheless, wire 136 will still be able to jump an arc 140 to the weld puddle 124. Finally, it is to be understood that more than one sensor wire and sensing circuit may be utilized and that the control system for relating the welding shoe travel speed to the weld metal level may be a PC based system.

Figure 13:
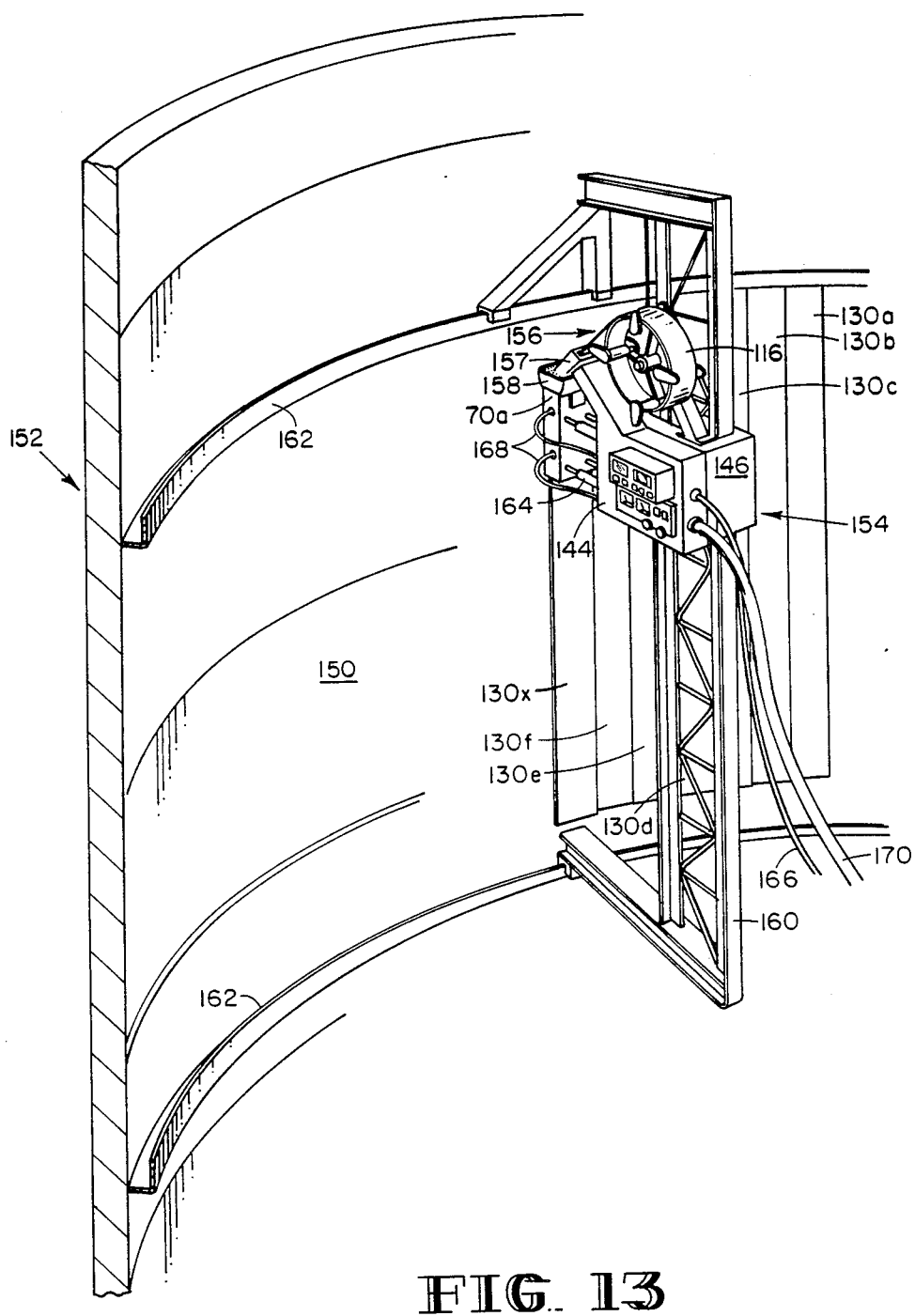
FIG. 13 is a perspective view illustrating the utilization of the present invention in the application of vertical strip cladding to the interior wall of a vessel.

Referring to FIG. 13, an apparatus for applying a plurality of successive, adjacent vertical weld beads 130a–130x to a vertical wall 150 of a vessel 152 is identified by the number 154. Identical numbers are utilized to identify components discussed hereinabove. The apparatus 154 comprises a controller 144, a carriage 146, a strip feeder 156, a welding head 157, and a flux hopper 158. The apparatus 154 also comprises an embodiment of the welding shoe of the present invention, identified in FIG. 13 as 70a. The controller 144, strip feeder 156, and welding head 157 are connected to carriage 146. Hopper 158 is a flux reservoir and is connected to shoe 70a in an appropriate manner, so as to receive and hold the molten slag. Hopper 158 is preferably constructed of a non-conductive material and preferably has a continuous flux feed top and a slag removal bottom. The carriage 146 is mounted to a vertical lattice or track 160 which may be removably secured to the angle iron 162 welded to the inside of wall 152. The carriage 146 is engaged with the lattice 160, such as by rack gear apparatus, so as to permit upward and downward (vertical) movement of carriage 146 along the vertical axis of track 160 in response to controller 144. Shoe 70a is connected to the carriage 146 and held against the vessel wall 152 by means of a plurality of air cylinders 164 which are connected to shoe 70a and carriage 146. A conduit 166 supplies water to the cooling passage (not shown) within shoe 70a by means of conduits 168 which are in fluid communication with the cooling passage. A power cord 170 is connected to controller 144 and an appropriate power supply (not shown). The power supply preferably supplies welding current and current for the carriage 146 through separate lines. Air is supplied to pneumatic cylinders 164 by means of a conduit (not shown) from an appropriate air supply (not shown).

It is to be understood that shoe 20 may be utilized in place of shoe 70a for applying the initial or "starter" bead 130a or in such applications where only a single bead is necessary. However, once the initial bead 130a has been applied, a single overlapping shoe, such as shoe 70 or 70a, may be utilized to apply each successive bead 130b–130x by replacing shoe 20 with shoe 70 or 70a and appropriately repositioning the apparatus 154 for each successive weld bead. Shoe 70a is a variation of shoe 70 in that leg 82 in shoe 70a is on the opposite side of channel 76 from the position of leg 82 in shoe 70. Further, in shoe 70a the inlet and outlet ports for the cooling passage within the shoe 70a are on the same side of shoe 70a. In shoes 20 and 70, the cooling passage inlet port and outlet port are on opposite sides of the respective shoe. It is also to be understood that the ground lead (not shown) from the power supply will be connected to wall 150 prior to operation.

Figure 14:
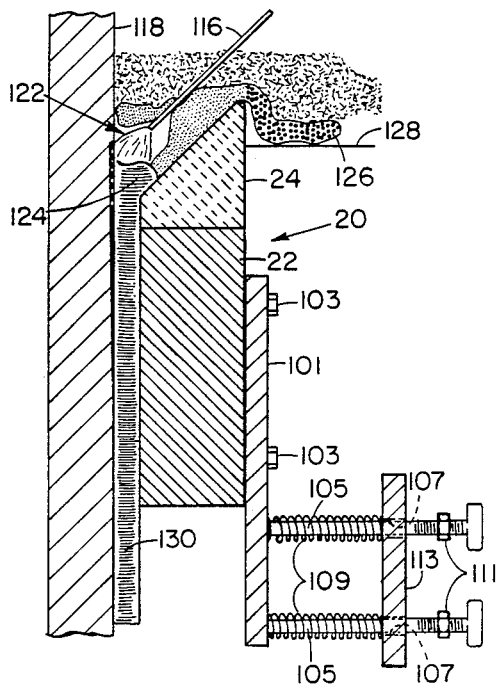
FIG. 14 is a cross-sectional side view illustrating one embodiment of the connection of the welding shoe of the present invention to a travel carriage.

It is to be understood that holding the welding shoe firmly against the surface of the vertical plate 114 is necessary to prohibit spillage of the melt. A non-rigid mechanical suspension arrangement is illustrated in FIG. 14 and comprises a steel backing plate 101 bolted to the back of the welding shoe of the present invention, such as shoe 20, by a plurality of bolts 103. A plurality of bolts or rods 105 are threaded into tapped holes in the lower portion of plate 101 below the height of shoe 20. Bolts 105 each extend freely through one of a plurality of passages 107 in wall 113 of a shoe travel carriage. Passages 107 have a diameter greater than the diameter of bolts 105. A tension spring 109 is positioned about each bolt 105 intermediate plate 101 and carriage wall 113. A retaining nut 111 is threaded onto each of the bolts 105 on the opposite side of the carriage wall 113 from springs 109. Nuts 111 are positioned against wall 113 for initial positioning of the shoe 20 but are backed away from wall 113 during welding operations, as illustrated in FIG. 14, thereby providing a compliant suspension arrangement. Further, four (4) bolts 105 may be utilized (two upper and two lower) with a spring 109 positioned about each bolt 105. In such an embodiment, the two upper springs 109 preferably exert approximately twice the expansive force that the two lower springs 109 exert. Finally, it is to be understood that gripping the shoe 20 at a low attachment point, for a shoe holder attachment angle of approximately thirty (30) degrees or less with the upper leading edge of the shoe 20, is desirable in order to prevent stubbing, chatter, and cocking of the shoe 20.

Figure 15:
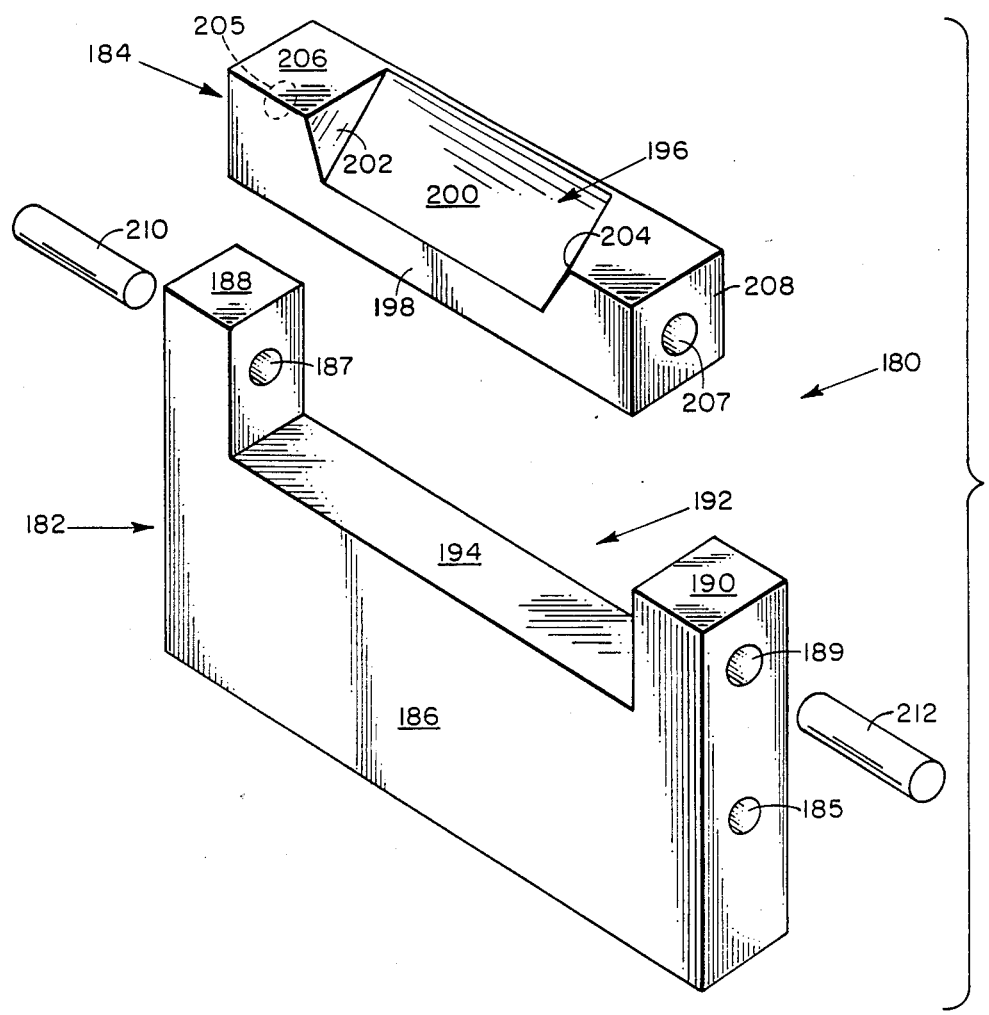
FIG. 15 is an exploded perspective view of an alternate embodiment of the welding shoe of the present invention.
Figure 17:
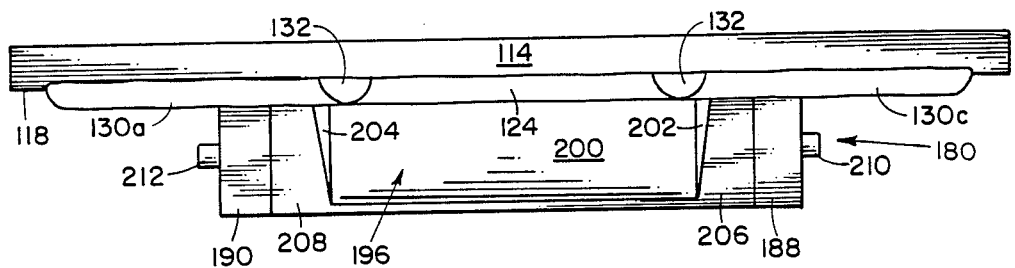
FIG. 17 is a top plan view illustrating the utilization of the embodiment of the welding shoe illustrated in FIG. 15 in the application of a weld bead to a base plate.
Figure 16:
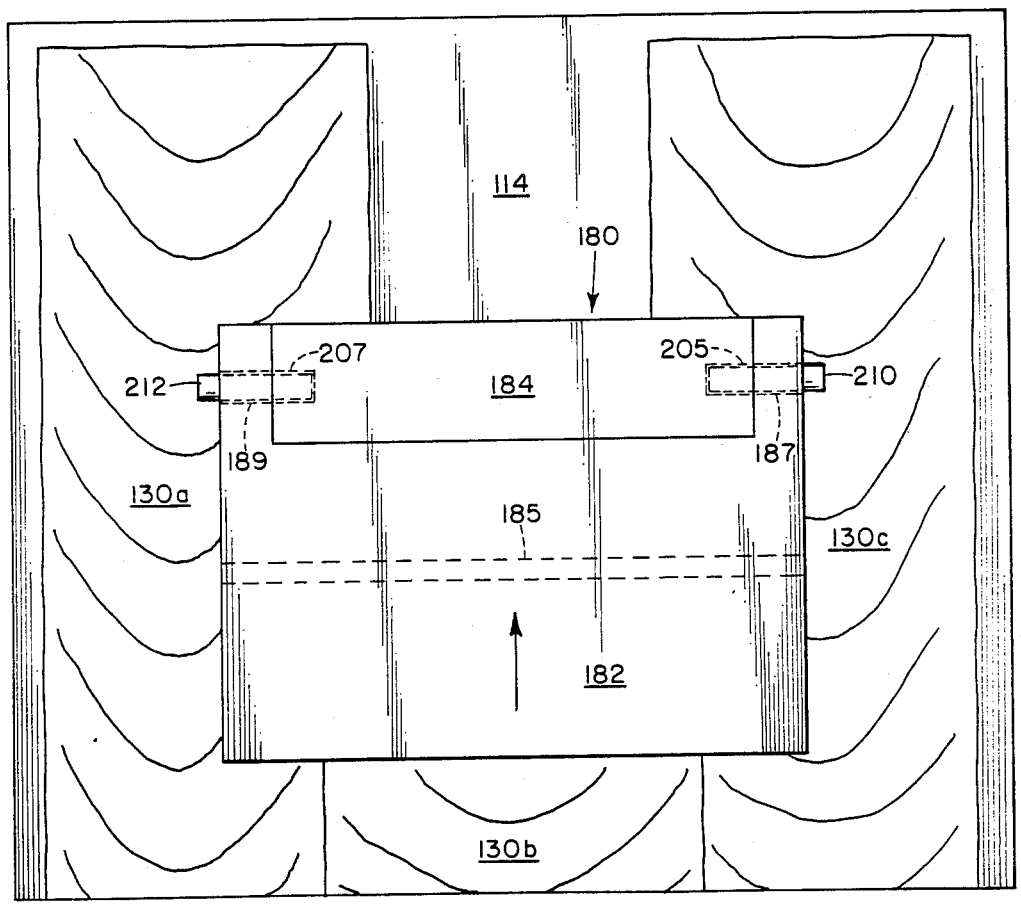
FIG. 16 is an elevational view illustrating the utilization of the embodiment of the welding shoe illustrated in FIG. 15 in the application of a weld bead to a base plate.

Referring to FIGS. 15–17, an alternate embodiment of the welding shoe of the present invention is identified by the number 180. The welding shoe 180 comprises a shoe mold 182 and a shoe insert 184 adapted to be removably connected to the mold 182. Shoe mold 182 is preferably a unitary piece of copper having a substantially planar inner surface 186 and a cooling passage 185 therein. Passage 185 permits water to flow through mold 182 for cooling mold 182. As illustrated in FIGS. 16–17, a pair of adjacent weld beads 130a and 130c are utilized to define a vertical channel wherein inner surface 186 is the bottom of the channel and each weld bead 130a and 130c defines a side wall of the channel. A pair of upstanding arms 188 and 190 on opposite ends of mold 182 define a slot 192 therebetween having a bottom 194. Arm 188 has a passage 187 therethrough and arm 190 has a passage 189 therethrough.

Referring again to FIGS. 15–17, insert 184 comprises a unitary piece of ceramic material having a channel or trough 196 therein. Trough 196 is defined by a lower bottom 198, an upper bottom 200, a first upper side wall 202, and a second upper side wall 204 opposite side wall 202. As illustrated in FIGS. 16–17, a pair of adjacent weld beads 130a and 130b are utilized to define a pair of lower trough side walls on opposite sides of lower bottom 198. Insert 184 further comprises a first end 206 having a passage 205 extending partially therethrough and a second end 208 having a passage 207 extending partially therethrough.

Referring again to FIGS. 15–17, shoe 180 further comprises a pair of plugs 210 and 212 for removably connecting insert 184 to mold 182. Insert 184 is preferably connected to mold 182 by inserting insert 184 into slot 192 so that insert 184 is supported by slot bottom 194, trough bottom 198 is aligned with inner surface 186, passage 205 is aligned with passage 187, and passage 207 is aligned with passage 189. Plug 210 is thereafter inserted into passage 187 and passage 205 and plug 212 is inserted into passage 189 and 207. When insert 184 is connected to mold 182, trough bottom 200 is at an incline of approximately forty-five (45) degrees with respect to the vertical alignment of trough bottom 198 and inner surface 186. Further, when shoe 180 is in use, as illustrated in FIGS. 16–17, trough 196 is in fluid communication with the vertical channel defined by inner surface 186 and adjacent weld beads 130a and 130c. Insert 184 may be disconnected from mold 186 by withdrawing plugs 210 and 212 from passages 205 and 207, respectively.

Referring to FIG. 16 and FIG. 17, the shoe 180 of the present invention may be utilized to apply a weld bead to a vertical base plate 114 in a manner similar to that described in connection with shoe 20. However, shoe 180 is utilized to apply a weld bead 130b to a vertical plate base 114 intermediate and adjacent to weld beads 130a and 130c by positioning the opposite sides of inner surface 186 flush with the outer surfaces of beads 130a and 130c. As the liquid weldment 124 passes from trough 196 into the channel defined by inner surface 186 and adjacent weld beads 130a and 130c, a bead tie-in 132 is formed between weldment 124 and adjacent bead 130a and between weldment 124 and adjacent bead 130c. Further, solidified weld beads 130a and 130c form retainer side walls to impede runoff of liquid weldment 124, as the shoe 180 travels vertically upward, as illustrated by the arrow in FIG. 16. A solidified weld bead 130b is thereby formed between beads 130a and 130c as liquid weldment 124 is cooled by mold 182. The double overlapping shoe 180 may therefore be utlizied to form bead-to-bead tie-ins and fusion of adjacent weld beads, thereby providing a continuous quality overlay.

Figure 18:
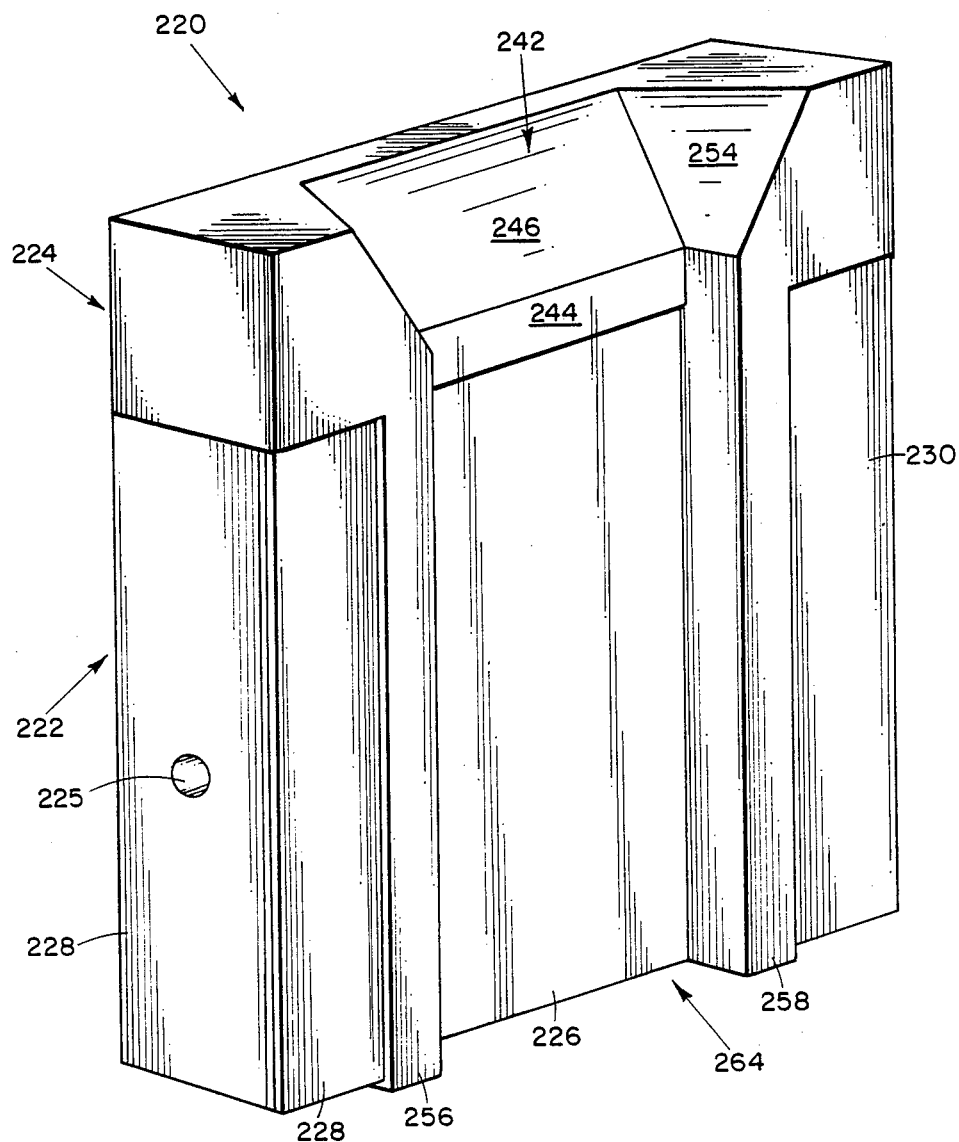
FIG. 18 is a perspective view of an alternate embodiment of the welding shoe of the present invention.
Figure 19:
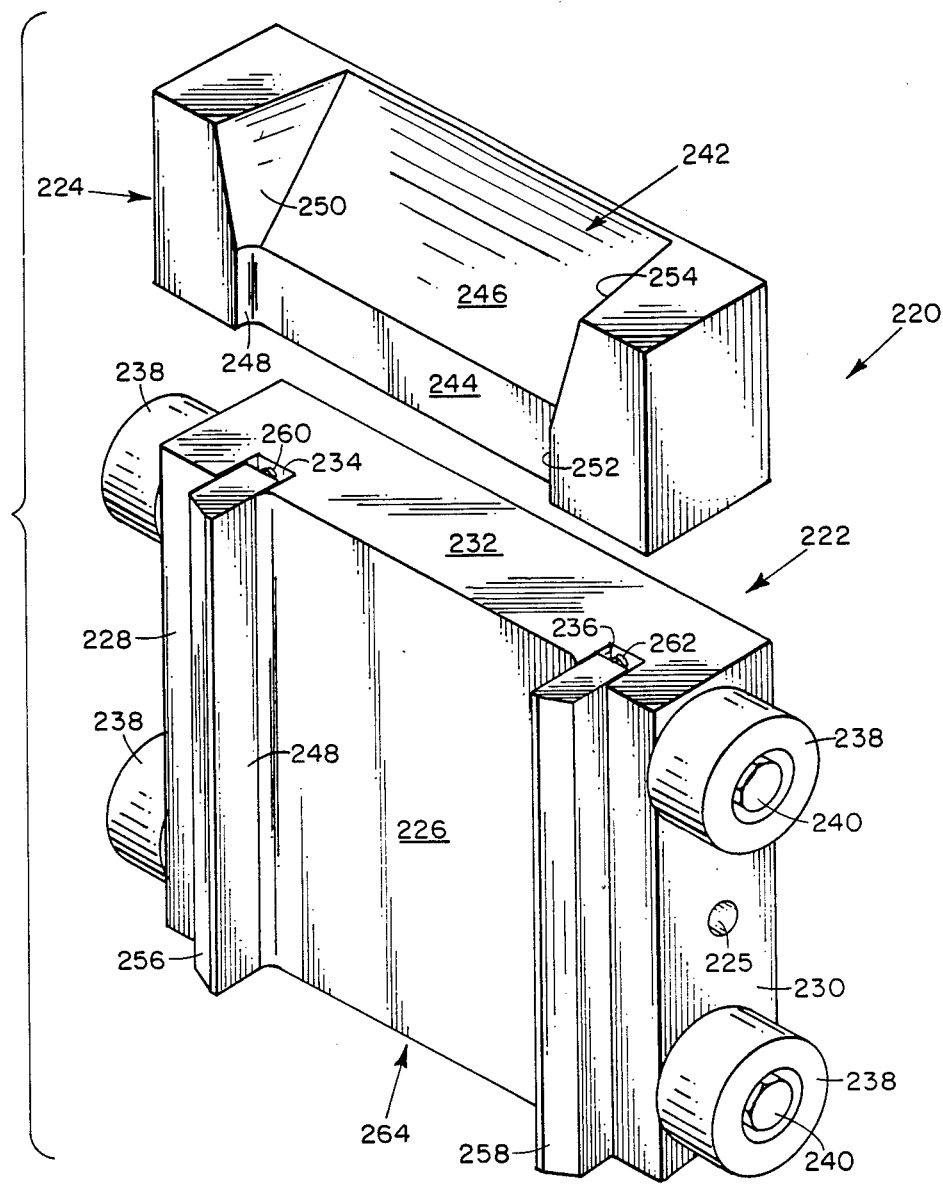
FIG. 19 is an exploded perspective view of the alternate embodiment of the welding shoe illustrated in FIG. 18.

Referring to FIG. 18 and FIG. 19, an alternate embodiment of the welding shoe of the present invention is identified by the number 220. The welding shoe 220 comprises a shoe mold 222 and a shoe insert 224 adapted to be connected to the mold 222. Shoe mold 222 is preferably a unitary piece of copper having a substantially planar inner surface 226 and a cooling passage 225 therein. Passage 225 permits water to pass through mold 222 for cooling mold 222. Shoe mold 222 further comprises a first leg 228 on one end thereof and a second leg 230 on the opposite end thereof. Mold 222 further comprises a top 232, a first slot or groove 234 intermediate leg 228 and surface 226, and a second slot or groove 236 intermediate leg 230 and surface 226. A plurality of rotatable wheels 238 are connected to legs 228 and 230 by means of a plurality of bolts 240. Each of the bolts 240 are inserted through a passage in one of the wheels 238 and connected to mold 222. For purposes of clarity, wheels 238 and bolts 240 are not illustrated in FIG. 18.

Referring again to FIG. 18 and FIG. 19, insert 224 comprises a unitary piece of ceramic material having a channel or trough 242 therein. Trough 242 is defined by a lower bottom 244, an upper bottom 246, a first lower sidewall 248, a first upper side wall 250, a second lower sidewall 252 opposite side wall 248, and a second upper side wall 254 opposite side wall 250. Trough bottom 244 is aligned with surface 226. Insert 224 further comprises a pair of integral runners or legs 256 and 258 which are adapted to be received within slots 234 and 236, respectively. Side walls 248 and 252 extend the entire length of runners 256 and 258, respectively. Runner 256 is connected to mold 222 by a plurality of tension springs 260 which are located within slot 234 and connected on opposite ends thereof to mold 222 and runner 256. Runner 258 is connected to mold 222 by means of a plurality of tension springs 262 which are located within slot 236 and connected on opposite ends thereof to mold 222 and runner 258. Runners 256 and 258 and inner surface 226 define a vertical channel 264 which is in fluid communication with trough 242. Further, trough bottom 242 is at an incline of approximately forty-five (45) degrees with respect to the vertical alignment of trough bottom 244 and surface 226. The upper portion of insert 224 is shown exploded away from runners 256 and 258 in FIG. 19 for purposes of illustrating springs 260 and 262.

It is to be understood that shoe 220 may be utilized to apply a weld bead 130 to a vertical wall 114 in a manner similar to that described in connection with shoe 20. However, during usage of the shoe 220, wheels 238 will ride upon vertical plate or wall 114 and springs 260 and 262 will urge ceramic runners 256 and 258 flush with wall 114. The copper mold 222 is separately supported by the travel carriage associated with shoe 220, such as by the non-rigid spring suspension apparatus or air cylinders described hereinabove, and will be offset a slight distance away from wall 114. The use of an insert 224 having integral bead molding runners 256 and 258 is intended to reduce the friction between the shoe 220 and wall 114. Further, the spring loaded runners 256 and 258 keep the sides of the weld bead hotter so that the sides of the weld bead do not chill and thereby interrupt movement of the shoe 220 against wall 114.

It is to be understood that ceramic inserts 24, 74, 184, and 224, are preferably a high density alumina ($Al_2O_3$) material or an eighty-five percent (85%) to one hundred percent (100%) alumina compound, thereby being better resistant to the arc and to chemical dissolution by the molten slag. For example, inserts 24, 74, 184, and 224 may be constructed of Narphos 85-P, a North American Refractory alumina compound used in repairing foundry ladles and furnaces. It is also preferable that the inserts 24, 74, 184, and 224 have a smooth finish, thereby reducing the friction of the shoe travel and the adherence of slag on the insert. It is also to be understood that the use of replaceable ceramic inserts for the "hot top" increases the efficiency of the vertical clad welding method and provides a longer life for the respective shoe. Plugs 64, 66, 108, 110, 210, and 212, are preferably brass or stainless steel. Further, the top or leading corners of the respective ceramic inserts and molds are preferably rounded to facilitate smoothness of welding shoe travel on the vessel wall. Finally, the respective shoe molds preferably provide approximately six inches (6") of copper chilling contact with the solidifying weld metal. That is, the cooling area length below the respective ceramic insert preferably provides a cooling surface approximately six inches (6") long.

It is to be understood that the liquid weldment 124 should be kept fluid until it reaches the lower end of the cooling channel of the weding shoe of the present invention and that the shoe surfaces should be kept as free of roughness and crevices as practical in order to prevent grabbing caused by projections formed on the weld. Accordingly, preheating of the vertical base plate and high current starting is generally desirable. Further, when the mechanical suspension arrangement illustrated in FIG. 14 is utilized, the set up of the welding head and the plate to be welded should be near to perpendicular for th spring pressure action of the shoe to control the weld. Finally, it is to be understood that molds 22, 72, 182, and 222 may also be constructed of steel.

It is to be understood that inserts 74, 184, and 224 may be provided with a high frequency wire 136 as described in connection with insert 24 for sensing weldment level within their respective troughs. Further, shoes 70, 70a, 180, and 220 may utilize the control system or apparatus described hereinabove for correlating the vertical travel speed of the respective shoe with the level of weld metal 124 within the respective trough. Alternatively, an infra red (IR) detector may be directed into a tube which is aligned with a blind hole molded through the backside of inserts 24, 74, 184, or 224 near (within approximately 3/16") the working face (upper trough bottom) of the respective insert for sensing the level of the arc pool within the respective trough. Two or more IR detectors may also be utilized. It is also to be understood that, although shoe 20 is illustrated in FIG. 3, FIG. 3 may also be considered a cross-sectional side view illustrating usage of shoes 70, 70a, 180, and 220 in the method of vertical overlay welding of the present invention. It is also to be understood that the mechanical and pneumatic apparatus described hereinabove for supporting the welding shoe of the present invention may be utilized with shoes 20, 70, 70a, 180, and 220.

While the method and apparatus for vertical strip clad overlay welding has been described in connection with the preferred embodiment, it is not intended to limit the invention to the particular form set forth, but, on the contrary, it is intended to cover such alternatives, modifications, and equivalents, as may be included within the spirit and scope of the invention as defined by the appended claims.

I claim:

1. A welding shoe, comprising:
  a mold having a channel therein, said channel having a substantially planar bottom adapted to be positioned substantially parallel to a substantially vertical base plate; and
  an insert adapted to be removably connected to said mold, said insert defining a trough adapted for alignment and fluid communication with said channel, said trough having a bottom portion at an incline with respect to said channel bottom when said insert is connected to said mold, said trough being positioned above said channel when said insert is connected to said mold and said shoe is positioned for usage thereof.

2. A welding shoe, comprising:
  an upper portion having a trough therein adapted to receive a pool of liquid weldment; and
  a lower portion relative to said upper portion, said lower portion having a channel therein for receiving said liquid weldment from said trough and forming said liquid weldment into a solidified weld bead, said channel having a substantially planar bottom adapted to be positioned substantially parallel to a substantially vertical base plate, said trough having a bottom portion at an incline with respect to said channel bottom.

3. A welding shoe, as recited in claim 2, wherein said upper portion comprises a ceramic insert and said lower portion comprises a copper mold having a fluid passage therein.

4. A welding shoe, as recited in claim 2, wherein said bottom portion of said trough is at an incline of approximately forty-five degrees with respect to said channel bottom.

5. A method for clad overlay welding, comprising the steps of:
  positioning a welding shoe adjacent to a substantially vertical base plate, said shoe comprising an upper portion having a trough therein adapted to receive a pool of liquid weldment and a lower portion relative to said upper portion having a channel therein, said channel having a substantially planar bottom adapted to be positioned substantially parallel to said base plate, said trough having a bottom portion at an incline with respect to said channel bottom;

generating an arc so as to create an arc melt on said base plate, said arc melt forming said liquid weldment which is received within said trough in said upper portion of said shoe; and moving said shoe vertically upward, thereby allowing said liquid weldment to flow from said trough into said channel in said lower portion of said shoe, thereby forming a solidified weld bead intermediate to said base plate and said channel bottom.

6. A method for clad overlay welding, as recited in claim 5, further comprising the step of correlating vertical travel speed of said shoe with the level of liquid weldment within said trough so as to permit said liquid weldment to continuously flow from said trough into said channel.

7. A method for clad overlay welding, comprising the steps of:

positioning a welding shoe adjacent to a substantially vertical base plate to which a weld bead is to be applied, said shoe comprising:

a mold having a channel therein, said channel having a substantially planar bottom adapted to be positioned substantially parallel to said base plate; and an insert connected to said mold, said insert defining a trough adapted for alignment with said channel, said trough being positioned above said channel and having a bottom portion at an incline with respect to said channel bottom;

feeding a strip electrode in proximity to said base plate and at a predetermined angle relative to said base plate;

generating an arc between said electrode and said base plate so as to form an arc melt, said arc melt forming a molten pool of liquid weldment within said trough;

detecting the level of said liquid weldment within said trough; and moving said shoe vertically upward in response to said liquid weldment level.

8. A method for clad overlay welding, comprising the steps of:

positioning a welding shoe adjacent to a substantially vertical base plate to which a weld bead is to be applied, said shoe comprising:

a mold having a substantially vertical channel therein; and an insert adapted to be connected to said mold, said insert defining a trough adapted for alignment with said channel;

feeding a strip electrode in proximity to said base plate and at a predetermined angle relative to said base plate;

generating an arc between said electrode and said base plate so as to form an arc melt, said arc melt forming a molten pool of liquid weldment within said trough;

detecting the level of said liquid weldment within said trough, said step of detecting liquid weldment level within said trough comprising the step of sensing voltage drop from a wire embedded in said insert; and moving said shoe vertically upward in response to said liquid weldment level.

9. Apparatus for clad overlay welding, comprising:

a welding shoe, said shoe comprising an upper portion having a trough therein adapted to receive a pool of liquid weldment and a lower portion relative to said upper portion having a channel therein, said channel having a substantially planar bottom adapted to be positioned substantially parallel to a substantially vertical base plate, said trough having a bottom portion at an incline with respect to said channel bottom;

means for feeding a strip electrode to a position above said shoe;

means for moving said shoe vertically relative to said base plate to which a weld bead is to be applied;

means for generating an arc between said electrode and said base plate, thereby generating said pool of liquid weldment within said trough; and means for correlating vertical travel of said shoe to a predetermined level of liquid weldment within said trough.

10. Apparatus for clad overlay welding, comprising:

a welding shoe, said shoe comprising an upper portion having a trough therein and a lower portion relative to said upper portion having a channel therein;

means for feeding a strip electrode to a position above said shoe;

means for moving said shoe vertically relative to a base plate to which a weld bead is to be applied;

means for generating an arc betwen said electrode and said base plate, thereby generating a pool of liquid weldment within said trough; and means for correlating vertical travel of said shoe to a predetermined level of liquid weldment within said trough, said means for correlating vertical travel for said shoe to a predetermined level of liquid weldment within said trough comprising means for sensing voltage drop from a wire embedded in said upper portion of said shoe and means for converting the corresponding signal from said sensing means to an appropriate instruction to means for moving said shoe.

11. A welding shoe, comprising:

a mold having a channel therein, said channel having a substantially planar bottom adapted to be positioned substantially parallel to a substantially vertical base plate;

an insert connected to said mold, said insert defining a trough adapted for fluid communication with said channel, said trough being positioned above said channel and having a bottom portion at an incline with respect to said channel bottom; and a plurality of wheels connected to said mold.

12. A welding shoe, as recited in claim 11, wherein said insert comprises a pair of runners which are adapted to be received within a pair of respective slots in said mold.

13. A welding shoe, comprising:

an upper portion having a trough therein adapted to receive a pool of liquid weldment; and a lower portion relative to said upper portion, said lower portion having a substantially planar inner surface for forming said liquid weldment into a solidified weld bead, said inner surface adapted to be positioned substantially parallel to a substantially vertical base plate, said trough having a bottom portion at an incline with respect to said inner surface.

14. Apparatus for clad overlay welding, comprising:

a welding shoe, said shoe having a trough in an upper portion thereof;

means for feeding a strip electrode to a position above said shoe;

means for moving said shoe vertically relative to a base plate to which a weld bead is to be applied;

means for generating an arc between said electrode and said base plate, thereby generating a pool of liquid weldment within said trough;

an infrared detector for sensing the level of liquid weldment within said trough; and means for correlating vertical travel of said shoe to a predetermined level of liquid weldment within said trough.

15. A method for clad overlay welding, comprising the steps of:

positioning a welding shoe adjacent to a substantially vertical base plate to which a weld bead is to be applied, said shoe having a trough in an upper portion thereof feeding a strip electrode in proximity to said base plate and at an angle relative to said base plate;

generating an arc between said electrode and said base plate so as to form an arc melt, said arc melt forming a molten pool of liquid weldment within said trough;

detecting the level of said liquid weldment within said trough, said step of detecting liquid weldment level within said trough comprising the step of sensing voltage drop from a wire embedded in said shoe; and moving said shoe vertically upward in response to said liquid weldment level.

16. Apparatus for clad overlay welding, comprising:

a welding shoe, said shoe having a trough in an upper portion thereof;

means for feeding a strip electrode to a position above said shoe;

means for moving said shoe vertically relative to a base plate to which a weld bead is to be applied;

means for generating an arc between said electrode and said base plate, thereby generating a pool of liquid weldment within said trough; and means for correlating vertical travel of said shoe to a predetermined level of liquid weldment within said trough, said means for correlating vertical travel of said shoe to a predetermined level of liquid weldment within said trough comprising means for sensing voltage drop from a wire embedded in said upper portion of said shoe and means for converting the corresponding signal from said sensing means to an appropriate instruction to means for moving said shoe.

* * * * *